Jan. 4, 1944. S. S. GREEN 2,338,109
LIGHTNING-PROOF WATT-HOUR METER
Filed April 15, 1939
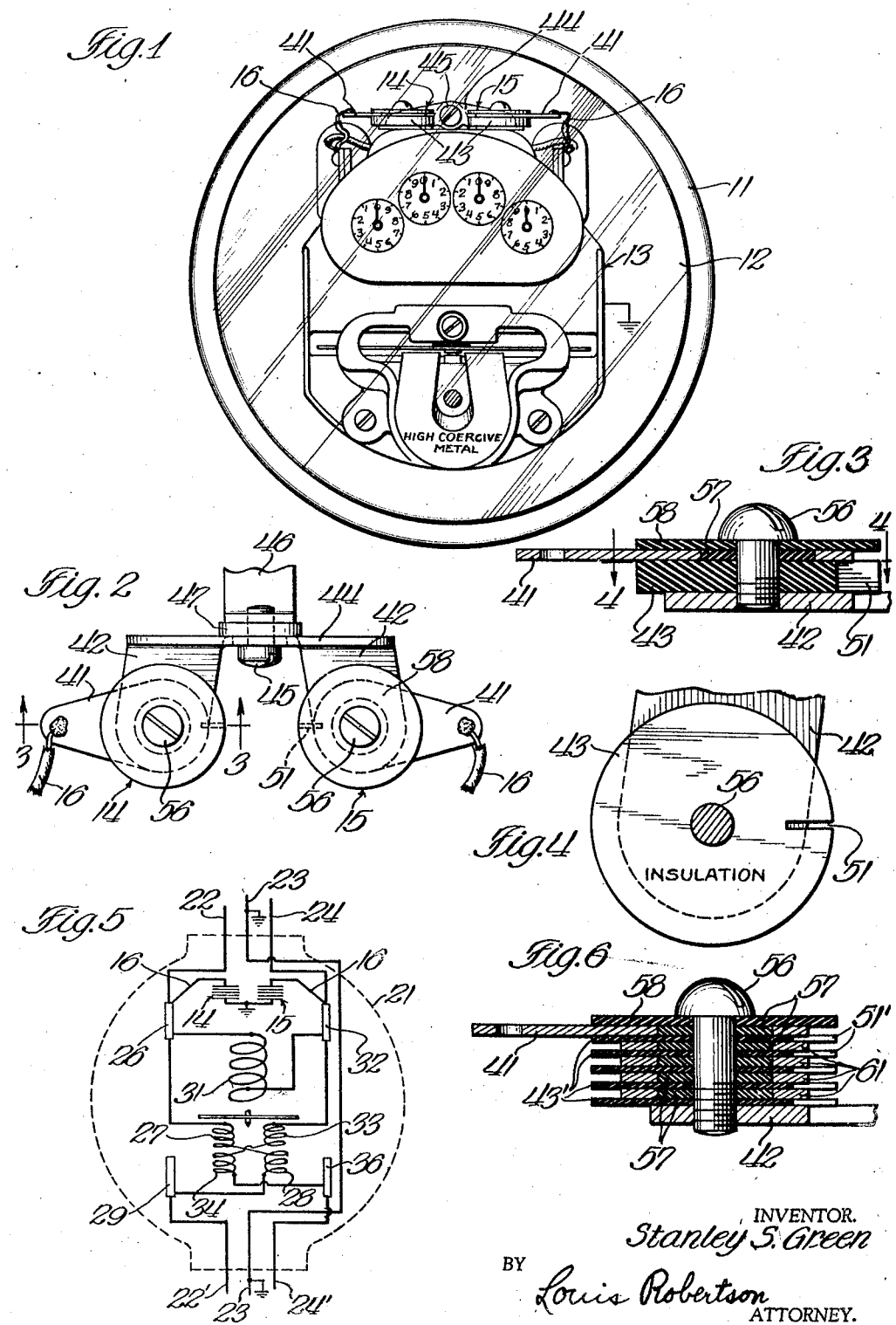
INVENTOR.
Stanley S. Green
BY Louis Robertson
ATTORNEY.

Patented Jan. 4, 1944

2,338,109

UNITED STATES PATENT OFFICE 2,338,109

LIGHTNINGPROOF WATT-HOUR METER

Stanley S. Green, Lafayette, Ind., assignor to Duncan Electric Manufacturing Company, Lafayette, Ind., a corporation of Illinois Application April 15, 1939, Serial No. 268,060

12 Claims. (Cl. 171—264)

This invention relates to watt-hour meters, or, in other words, to electric meters such as are used in millions of homes, offices and factories. More particularly, it relates to the protection of such meters from injury when lightning strikes the wires to which the meter is connected.

For many years the manufacturers of watt-hour meters have endeavored to make their meters less subject to injury by lightning. Heretofore the efforts of the industry have been exerted toward making the watt-hour meter better able to withstand lightning surges without injury while the present invention proceeds on the theory of preventing the lightning surge from reaching the meter element. In short, the present invention provides for diverting or arresting the lightning before it strikes the meter element with sufficient strength to injure the same.

The principles of lightning arrestors have been known for many years. In fact, it is probable that at the same time the various public utility companies in the country were replacing thousands of meters a year because they were damaged by lightning, they were also spending hundreds of thousands of dollars a year in developing and installing lightning arrestors for protecting other types of equipment which being much more expensive than watt-hour meters justified the cost of protection. In spite of the knowledge and common use of lightning arresting principles and the full use of these principles for expensive equipment, it was considered entirely out of the question to protect the relatively inexpensive watt-hour meters in this manner. Although there may have been various types of lightning arrestors which would do the work satisfactorily, their cost and space requirements were such that it simply was not economically possible to use them for watt-hour meters. Although the total number of meters damaged each year is fairly large, the percentage of all the meters in use is very small, and therefore the cost of any arrestor which is used with the watt-hour meters must be only a very small percentage of the cost of the meters. Furthermore, even an arrestor which in itself is very inexpensive would in effect be too costly if it required an enlargement of the meter case or the provision of a separate case for housing it or required considerable labor in installing it.

The underlying principle of lightning arrestors is to provide a spark gap with one side of the gap connected to the wire which may be struck by lightning and the other side connected to ground so that a high voltage lightning surge will jump across the gap to ground instead of going to ground through the equipment to be protected. In order for the gap to protect the equipment, the length of the gap, i. e. the distance that the lightning must jump, must be small enough so that the lightning can jump it more easily than it can reach ground through the path going through the equipment. Therefore, the gap must be quite short or narrow, the two terms being synonymous in this sense. With a short gap, however, once the high voltage of the lightning starts the arc, the arc may be maintained by relatively low voltage, namely the voltage available from the power lines. Such a continuing arc can be very disastrous. It may melt a great part of the meter or even cause an explosion and it may set fire to a building in which the meter is located. The recognition of the likelihood and danger of an arc maintained by the line current accounts for the fact that those skilled in the art have been quite sure that the only arrestor which could be used in theory would be an arrestor of the more expensive, thoroughly self-quenching type, which for economic reasons simply could not be used in practice. If there were any safe arrestors that were economically possible, this fact was not known to those skilled in the meter industry.

According to the present invention that which has heretofore been regarded as an impossibility has been accomplished. A conventional type of watt-hour meter in its conventional housing without any enlargement thereof has been combined with a very inexpensive form of lightning arrestor together with an additional feature which eliminates all danger and substantially eliminates all damage from maintained arcs. The additional feature is one which can be provided without additional cost since it comprises the simple expedient of connecting the arrestor through a wire which is sufficiently small in diameter to serve as a fuse so that, if an arc is maintained long enough to do any damage, the high current forming the arc will melt the connecting wire. For convenience, this connecting wire may be called a fuse or a connecting fuse, although it is preferably made of copper rather than the lead which is more commonly thought of as a fuse.

Although the melting or blowing of the fuse would render the lightning arrestor ineffective thereafter to protect the meter, this disadvantage is largely overcome according to the preferred form of the invention by two expedients. First, the fuse is located within the glass cover of the meter and is of such nature that it will produce a visible smudge so that the meter reader will detect the blown fuse at his next reading of the meter. Second, the arrestor is preferably of a form which will ordinarily quench the arc before the connecting fuse blows. In short, the lightning arrestor will protect the meter from harm from lightning surges, and, in the exceptional instances when it would fail to protect the meter from a subsequently maintained arc, this latter protection is furnished by the blowing of the connecting fuse.

There is one part of the meter which would not necessarily be protected in this manner, and that is the permanent magnets which are sometimes weakened by the passage of a surge of lightning through the wires adjacent the meter even though there is no other damage to the meter. Accordingly, in order to make the meter almost completely lightning-proof, it is preferred to use in combination the arrestor and connecting fuse for protecting the electrical parts of the meter, and a magnet of high coercive metal which is inherently capable of withstanding nearly all of the lightning surges passing through nearby wires.

Further advantages and objects of the invention will be apparent from the following description and from the drawing, in which:

Fig. 1 is a front view of a meter embodying this invention with a portion removed for the sake of clarity.

Fig. 2 is a fragmentary view looking down on the lightning arrestors shown at the top of Fig. 1.

Fig. 3 is a fragmentary sectional view taken approximately on the line 3—3 of Fig. 2.

Fig. 4 is a fragmentary sectional view taken approximately on the line 4—4 of Fig. 3, showing particularly the insulating separator.

Fig. 5 is a circuit diagram for the meter shown in Fig. 1.

Fig. 6 is a modified form of the lightning arrestor shown particularly in Figs. 2 to 4.

Although this invention may take various forms, only two have been chosen for the purpose of illustration. They have been illustrated as embodied on a three-wire single-phase meter although the invention could be used on other meters equally well.

As illustrated in Fig. 1, the meter includes a base 11, a glass cover 12, a measuring element indicated as a whole by the numeral 13, and lightning arrestors 14 and 15 connected to special wires 16.

The reason for showing two lightning arrestors is best seen from the circuit diagram in Fig. 5. In this figure the dotted outline 21 designates a conventional socket, the invention being illustrated with the socket type meter although equally adapted to other types of meters. In the socket type meter the service wires 22, 23 and 24 enter the meter through a conduit at one side or the top of the meter, and the wires 22', 23 and 24' to the load or circuit being measured pass out of the meter in a conduit on the far side or bottom of the meter. It is conventional practice to ground one of the wires, and the wire 23 has been illustrated as grounded, this wire in a single-phase three-wire circuit being the wire that is called the neutral wire. It should also be remembered that the socket, frame, electromagnet cores and other metal parts of the meter are also grounded more or less perfectly either by way of the conduit connection leading the wires into the socket or because they may be deliberately grounded as for safety conditions. To illustrate this, schematically, in Fig. 1 the frame of the meter has also been shown as being connected to ground. If the lightning strikes the grounded wire, it passes directly to ground without going through the meter element and hence no lightning arrestor on that wire is necessary. If the lightning strikes wire 22, however, it tends to flow through the meter to reach ground. The conventional circuit for the wire 22 may be traced to the terminal blade 26, from which it may proceed in either of two paths. It may pass through the current coils 27 and 28 to terminal blade 29, and thence through wire 22' into the load circuit, from which it will return to the grounded wire 23. Alternatively, it may tend to pass from terminal blade 26 through voltage coil 31 to terminal blade 32, and thence through current coils 33 and 34 to terminal blade 26, from which it would pass through wire 24' to the load circuit and back to the grounded wire 23. In some circuits this latter path through voltage coil 31 would be particularly pertinent since a grounded wire would be connected directly to one side of the voltage coil 31. As a matter of fact, the inductance and resistance of both of these paths is usually too great to enable them to accommodate a strong lightning surge. As a result, such a strong surge would usually, prior to this invention, break down the insulation at some point and establish an arc between a part of one of these circuits and some grounded metal portion of the meter. In any event, it is observed that if lightning strikes wire 22 it can get to ground only by passing through either coil 31 or the coils 27 and 28 or by breaking down the insulation at some point and jumping more directly to some grounded metal such as the metal portions of the meter base or the structural portions of the meter element. Thus, whenever a sufficiently strong bolt of lightning strikes the wire 22, damage would be sure to result but for the lightning arrestor 14 which forms a harmless path from the terminal blade 26 to ground. Likewise, without tracing the circuit in detail, lightning striking the wire 24 would have to pass through either coil 31 or coils 33 and 34 or else break down some insulation in order to get to ground, except that according to the present invention the arrestor 15 provides a harmless path to ground. In short, an arrestor should be provided for each wire which is not already sufficiently grounded to prevent arcing-over within the meter case.

The arrestors comprise essentially a spark gap so that they have no effect on the circuit except when an abnormally high voltage, such as that of lightning, is impressed on the circuit. This voltage will cause the current which lightning comprises to jump the gap and pass directly to ground. Thus, in case lightning strikes the wire 22 it will pass to the terminal 26 and from there through connecting wire 16 to the plate or electrode 41, and from there it will, under the influence of the high voltage of lightning, jump to the grounded electrode or plate 42 which is accurately spaced from electrode 41 by an insulating block 43. The most convenient manner of grounding the plate 42 is to use it as a support plate so that it is connected to the meter base which in turn is conventionally grounded. Thus, as seen in Fig. 2, the plate 42 is in reality an arm bent forwardly from a support bracket 44 which is secured by screw 45 to a bracket 46 which in turn is secured to the meter base 11. The screw 45 may be a screw which is conventional in the meter for securing to the bracket 46 a mounting lug 47 forming a part of the driving magnet structure. With this manner of mounting and grounding the lightning arrestor, no additional cost is involved in the lightning protection other than the slight cost of the lightning arrestor itself and the connecting wire 16.

As previously stated, the electrodes 41 and 42 must be accurately spaced from one another so as to provide a spark gap of accurate length. It has been found that to protect meters the gap must break down (permit a spark to jump) on a voltage from 5500 to 7000 volts. Of course, the exact voltage which the meter can stand depends on the design of the meter and the effectiveness with which it is insulated, and for the arrestor to be a protection it must jump the gap of arrestor 14 more readily than it will break down insulation or jump any gap in the meter element. It has been determined that a desirable gap length is .060 to .080 inch for at least some of the present commercial meters.

Although approximately 5500 volts or more is initially required to make a spark jump a gap of .080 inch, it does not follow that as soon as this high voltage is discontinued the spark will cease. As a matter of fact, the term "break down" is used because, once the spark jumps, it breaks down the resistance of the gap so that a spark or arc may continue on a relatively low voltage. Under some conditions an arc would be maintained on a gap of .080 inch by the voltage which is normally available from the line wires 22 or 24. The type of circuit which would maintain this arc is a low impedance circuit in which a very heavy current is available. Thus, if the supply wire 22 after being struck by lightning to break down the gap of arrestor 14 is capable of supplying a current of say 2000 amperes with approximately normal voltages, there would be danger in the absence of special provision to the contrary that this current would maintain an arc between the electrodes 41 and 42. An arc of such high amperage would be disastrous. Its heat would very rapidly melt the electrodes and other parts of the meter and it might even cause an electrical explosion. Such an electrical explosion could result in setting a building on fire, and even without such disastrous results the meter could be completely ruined. It is because of this inherent danger in the use of inexpensive and small types of lightning arrestors that the use of lightning arrestors for protecting meters has been considered economically impossible. The types of arrestors which safely overcome the danger of the continuing arc are so expensive and take up so much room that their use for protecting a relatively inexpensive meter has been assumed to be commercially impossible.

This hitherto insurmountable difficulty has been overcome according to the present invention by very simple and inexpensive expedients. The ultimate of safety is obtained by using a connecting wire 16 which is so chosen that it will melt as a fuse and interrupt the current before any substantial damage can be done. The surge of lightning current does not ordinarily melt this wire since the current from lightning itself is not of sufficiently high amperage to melt the wire in the extremely short duration that the current lasts. However, if, after the lightning breaks down the gap, an arc is maintained of sufficient amperage to do substantial damage, it will very quickly blow the fuse connection 16 and hence prevent the occurrence of such damage. The fuse connection 16 is preferably a copper wire of the largest size which can be safely counted on for preventing a harmful maintenance of arc. With the illustrated form of lightning arrestor it has been found that 18-gauge copper wire is satisfactory. This wire may be conventionally insulated as with rubber and cotton or silk. Of course, once the wire 16 blows out, the lightning arrestor 14 ceases to protect the meter from further bolts of lightning striking the wire 22. However, the meters are customarily inspected approximately once a month and the connecting fuse 16 when it blows out makes a smudge which is visible on the glass case and it will apprise the meter reader of the fact that a fuse has been blown so that he may immediately replace it. As a matter of fact, the fuses are very rarely blown because of the second feature of protection against the maintenance of arcs, namely the use of an especially suitable type of lightning arrestor.

The especially suitable lightning arrestor is one which is of the self-quenching type and which tends to limit the amperage of an arc maintained at low voltage. Two forms of this preferred lightning arrestor have been illustrated although there are probably other equally suitable forms. Between the two forms, that shown in Fig. 3 is preferred because of lower cost while that shown in Fig. 6 might have slightly better performance, i. e. it might result in blowing the fuse 16 even more rarely than with the lightning arrestor shown in Fig. 3. It might be mentioned that with both forms the electrodes should be made of a metal which has high electrical and heat conductivity. Copper is suitable, although in some instances zinc may be used because of its "arc-quenching" properties.

In the form shown in Fig. 3 the two electrodes 41 and 42 are separated by a single insulator 43 which may be either a hard fiber washer or a porcelain washer, the fiber being at present preferred because of lower cost and because it may have slightly better quenching characteristics. The washer is provided with a slot 51, seen best in Fig. 4, extending from the periphery of the washer inwardly a distance such that the slot slightly overlaps the electrodes 41 and 42. In other words, the slot between the electrodes forms an open spark gap having its shortest path restricted in cross section. The breakdown of the arc will occur in this direct path, but in the case of a high voltage if the path is not of sufficient cross section to carry the amperage available at the high voltage which will relieve the voltage, the arc may spread radially outwardly in the slots 51 so as to make use of a longer cross section of the slots, the current flowing through this portion of the arc, however, having a longer path. Because of the fact that any excess of current over that which can flow in a straight line from electrode 41 to electrode 42 must take a longer path, this arrestor tends to restrict the flow of current to a relatively small value. The small current value in turn tends to prevent the arc from maintaining itself under normal low voltage conditions. As a result the gap not only tends to limit the current while the arc is maintained but tends also to quench the arc rapidly. As a matter of fact, it is possible that the fiber has some additional spark quenching effect as by the emission of some gas during the arcing. Also, the relative confinement of the air within the slot 51, and perhaps other factors, may contribute to the quenching action.

It has been found that this form of lightning arrestor will almost always limit the arc following a bolt of lightning sufficiently as to amperage and time of duration so that the fuse connection 16 will not be blown. With different meter designs, different circuit conditions and with fuse connections of different current carrying capacities, lightning arrestors of different characteristics may be desired. However, as an aid in duplicating that which has been found to be satisfactory or as an aid to determining what would be satisfactory under other circumstances, the following dimensions are given: The gap width of .060 to .080 inch has already been mentioned. With the form of gap illustrated and the meters on which it has now been used, a gap of .080 inch is preferred. The fiber separating washer 43 is therefore .080 inch thick; its outside diameter is 1⅜ inch; the radius from its center to the base of the slot 51 is ¼ inch, thus making the length of the slot 3/32 inch. The electrodes or arcing plates extend 1/16 inch beyond the base of the slot. The width of the slot is approximately .020 inch. This makes the area of exposed electrode on the surfaces of the electrodes nearest each other, and hence the cross-sectional area of the shortest path in the gap, 1/800 of a square inch.

In addition to the physical features enumerated with respect to arc-quenching ability of the gap for the "follow" current, it should be emphasized that the high breakdown value of the gap initially (that is, around 5500 to 7000 volts) tends strongly to limit the follow current, even on circuits capable of delivering 2000 amperes or more in follow current and with the circuit voltages in common use on small capacity meters of approximately 120 volts. If the gap were made much shorter in length so as to protect against, or break down under, say 2000 volts of lightning surge, then the tendency for follow current would be very greatly increased and the connecting wires would be blown even on relatively low capacity circuits of say 1000 amperes. The insulation on most good modern meters will withstand over 6000 volts momentarily, and the preferred form of arrestor described here takes advantage of this fact and by doing so of course greatly reduces the chance of the connecting wires fusing because of the follow current. Actually, the preferred forms described will usually have the 18-gauge connecting wires remain intact on circuits capable of delivering 2000 amperes at 50 percent power factor. Circuits capable of delivering more current than this are extremely rare in actual commercial service, but in case such a circuit is encountered, the fusible connecting wires take care of that eventuality. Of course, larger connecting wire than 18-gauge copper could be used with still further decrease in tendency for the connecting wires to be fused on heavy follow currents, but at present 18-gauge is preferred.

The manner of securing the arrestor assembly together while keeping its plates insulated from one another is of course unimportant. One convenient manner which is illustrated is to secure the parts together by a screw 56 which screws into the support plate or electrode 42 and is insulated from the electrode 41 by a fiber spacing washer 57 which may be ⅜ inch in diameter and by a fiber end washer 58 which may conveniently be of the same diameter as the gap-forming washer 43.

The form of lightning arrestor shown in Fig. 6 is very similar to that shown in Figs. 3 and 4 except that instead of having a single gap it has a series of small gaps. Thus, in addition to the electrodes 41 and 42 there are a plurality of arcing plates 61 insulated from each other and from the screw 56 by additional spacing washers 57 and by thin gap-forming washers 43'. The gap-forming washers 43' may be identical with the gap-forming washer 43 except that they will be thinner, their total thickness being such that the series of gaps will break down at the same voltage as would the single gap of Fig. 3. The chief advantage of this form of arrestor is that it has a greater tendency to limit the current in the arc under low voltage conditions and has a greater quenching action. Both of these may be, in part at least, the result of the fact that each arc jumping between one of the small gaps must, if the current is excessive, follow a greatly elongated path from one electrode or washer out through a remote part of the slot 51' in one of the gap-forming washers 43', and back again to the metal forming the next electrode or arcing washer and perhaps not to the nearest surface thereof. The result is that, instead of having its length elongated once as in the single-gap arrangement of Fig. 3, it has its length elongated at least as much or perhaps even more for each of the gaps in the series of gaps of Fig. 6.

Although the use of either of these arrestors protects the meter adequately against the possibility of breakdown or arcing at injurious points as a result of lightning striking one of the supply wires, they will not prevent weakening of the permanent magnet conventionally used for retarding or damping the disc. For example, one of the most common causes of weakening of the magnets in the past has been lightning striking the neutral wire 23 or some other grounded wire. In such event, a heavy surge of current will flow through the wire and past the meter in close proximity thereto. This heavy surge of current, although momentary, will create a very strong magnetic field which may exert a demagnetizing effect on the permanent magnet used for damping. As long as the magnets are easily weakened in this manner the meter cannot be considered lightning-proof to any great degree. Of course, the protection comprising the arrestor 14 and fuse connection 16 will still be highly desirable because of protecting the meter from harm of a costly nature. In addition to furnishing this protection, however, it is necessary, in order to have a substantially lightning-proof meter, to make adequate provision against the weakening of the permanent magnets. According to the present invention this combination of protection from lightning breakdowns and protection from lightning knockdowns is provided by combining with the lightning protection, already described, the feature of high coercive, highly knocked-down magnets. The knock-down of a magnet is the process of stabilizing it by partially demagnetizing it before its application to the meter. It is accomplished by a strong alternating current magnetic field, and the magnet will not be further weakened except by a stronger knock-down force. This feature of unusually high coercive force and knockdown was described in my prior Patent No. 2,110,418, issued March 8, 1938. Briefly described to the extent pertinent here, it consists in the use of a magnet material of high coercive strength such as that now manufactured under the trade name "Alnico," and knocking down the magnet (partially demagnetizing it after it has been fully magnetized) to a sufficient degree to render it substantially immune from further knockdown except by the most extreme and unusual lightning surges. Although "Alnico" has a coercive strength of over 400 oersteds, substantial protection from lightning can be obtained by the use of material which has less coercive strength than this. It is believed, however, that the material should have a coercive strength of at least 350 oersteds so that after being subjected to a knockdown force resulting from 250 to 300 ampere turns of alternating current with a magnet of three inches minimum length and having a total air gap length of as much as .250 inch, its maximum demagnetizing rate, upon encountering even greater knockdown forces, will be low, preferably not over approximately ½% per additional oersted. Tests have indicated that the magnets here described will be weakened by only a small fraction of a per cent by a surge of current as high as 17,000 amperes in the neutral wire, while a surge of current of 8,000 amperes, which will weaken old style magnets over three per cent (more on subsequent surges), will weaken the magnets here described by an amount so small as to be hardly detectable with the most accurate measurements, ten such surges producing a weakening in the neighborhood of $\frac{1}{10}$ of one per cent. Apparently the lightning surges are too brief in duration to produce the maximum demagnetizing effect of the coercive force available.

From the foregoing it is evident that a watt-hour meter has been provided which is entirely practical commercially and is substantially immune from damage by lightning. The high coercive, highly knocked-down magnets withstand the weakening tendencies of high amperage lightning surges, and the lightning arrestor diverts the lightning current directly to ground so that it will not flow through the meter element or spark over at points that would be injurious. At the same time the lightning arrestors although of a very inexpensive nature have sufficient self-quenching characteristics as to prevent the maintenance of an arc due to line voltage after cessation of the lightning surge, except in very extreme cases, in which extreme cases all danger is completely avoided by the presence of the fuse connection which will blow out in these rare circumstances, thus interrupting the maintained arc before it has been maintained long enough to do any appreciable damage. Furthermore, the current-limiting tendencies of the preferred forms of lightning arrestors at low voltage are such that it will be very rare that the fuse connection is blown, if a fuse size is chosen which is large enough to permit a current flow which is fairly heavy but not heavy enough to cause substantial damage. Of course, even a current flow which is thus permitted may pit the arcing electrodes somewhat, but ordinarily this pitting will be negligible, and when it has any effect it will merely increase the length of the arc so that the meter will not be quite as thoroughly protected from injury as before. Under all circumstances the fuse connection completely avoids any danger which might otherwise be attendant upon the use of this inexpensive type of lightning arrestor. These various considerations and the small size of the arrestor make it entirely possible to provide one or more arrestors within the conventional meter case so that the meter will be protected without any extra labor on the part of the utility companies installing the meter and so that the arrestor will be subject to inspection and so that if a fuse blows this fact will be detected when the meter is read and a fuse replaced promptly.

This invention is especially useful in rural locations where the exposure of the line wires and the relatively small number of meters forming a path to ground make the likelihood of damage by lightning much greater than in cities. Furthermore, the rural conditions greatly decrease, if they do not eliminate, the chances of a current sufficiently strong to maintain an arc after the lightning surge. Under such conditions it might be found that the connecting wire 16 need not be carefully chosen to serve as a fuse, but in practice it will be so chosen in any event (unless possibly some built-in type of construction should render unnecessary any connecting wire) since the use of a proper sized wire does not entail any extra cost.

A useful by-product of the installation of the arrestors in the meter case is the protection afforded against lightning surges for apparatus on the load side of the meter on the premises served by the meter. Although much of this apparatus is not of a design sufficient to withstand the high voltage that will be withstood by the meter, the lightning surge will nevertheless dissipate itself through the arrestor before reaching such apparatus because the current coils of the meter act as a choke coil because of their high inductance. It is easier for the surge to take the path through the gap of the arrestor than through the meter coil and to ground even though the latter path exclusive of the meter coil may be somewhat easier.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. A watt-hour meter including a conventional case, a meter element within the case, connecting conductors for connecting the meter element in a circuit, and means for protecting the meter element from lightning which comprises a lightning arrestor of the spark gap type positioned within the case and connected to one of said conductors and adapted to be connected to ground, and a connecting wire forming a part of the circuit for connecting said arrestor between said conductor and ground adapted to be melted by any current value which would cause an arc to be maintained across said spark gap for a sufficient length of time to do substantial damage; the meter element being connected through said conductors to the measured circuit independently of said connecting wire.

2. A watt-hour meter including a meter case and a measuring element within the case, characterized by the provision of lightning protection means within the case comprising a spark gap and a fuse connected in series between a line conductor and a ground conductor, the spark gap being sufficiently short to protect the element from flash-overs due to lightning surges, and the fuse being adapted to melt before any arc can be maintained across the spark gap long enough to do any damage other than slight damage to the spark gap; the meter element being connected through said conductors to the measured circuit independently of said fuse.

3. The combination of a watt-hour meter and lightning protecting means therefor including a spark gap and a fuse normally free from current connected in series between a line conductor and a ground conductor, the spark gap being sufficiently short to protect the meter from flash-overs due to lightning surges, and the fuse being adapted to melt before any arc can be maintained across the spark gap long enough to do any damage other than slight damage to the spark gap.

4. A watt-hour meter including a meter case and a measuring element within the case, characterized by the provision of lightning protection means within the case comprising a spark gap and a fuse connected in series between a line conductor and a ground conductor, the spark gap being sufficiently short to protect the element from flash-overs due to lightning surges, and the fuse being adapted to melt before any arc can be maintained across the spark gap long enough to do any damage other than slight damage to the spark gap, said gap being of a type which tends to restrict the current, except at extremely high voltages, to a value which the fuse can carry without melting; the meter element being connected through said conductors to the measured circuit independently of said fuse.

5. The combination of a watt-hour meter and lightning protecting means therefor including a spark gap and a fuse normally free from current connected in series between a line conductor and a ground conductor, the spark gap being sufficiently short to protect the meter from flash-overs due to lightning surges, and the fuse being adapted to melt before any arc can be maintained across the spark gap long enough to do any damage other than slight damage to the spark gap, said gap being of a type which tends to restrict the current, except at extremely high voltages, to a value which the fuse can carry without melting.

6. A substantially lightning-proof watt-hour meter including a meter case and a measuring element within the case, characterized by the provision of lightning protection means within the case comprising a spark gap and a fuse connected in series between a line conductor and a ground conductor, the spark gap being sufficiently short to protect the element from flash-overs due to lightning surges, and the fuse being adapted to melt before any arc can be maintained across the spark gap long enough to do any damage other than slight damage to the spark gap, said gap being of a type which tends to restrict the current, except at extremely high voltages, to a value which the fuse can carry without melting, and being further characterized by the provision of a permanent magnet in the measuring element which is made of a metal having a coercive force of at least approximately 350 oersteds and which has been knocked down prior to calibration of the meter by a coercive force equivalent to at least 120 oersteds in addition to the coercive force of the air-gap length with which it is to be used, and having a maximum demagnetizing rate for initial further knockdown of not over one-half percent per additional oersted.

7. A substantially lightning-proof watt-hour meter including a meter case and a measuring element within the case, characterized by the provision of lightning protection means within the case comprising a spark gap and a fuse connected in series between a line conductor and a ground conductor, the spark gap being sufficiently short to protect the element from flash-overs due to lightning surges, and the fuse being adapted to melt before any arc can be maintained across the spark gap long enough to do any damage other than slight damage to the spark gap, and being further characterized by the provision of a permanent magnet in the measuring element which is made of a metal having a coercive force of at least approximately 350 oersteds and which has been knocked down prior to calibration of the meter by a coercive force equivalent to at least 120 oersteds in addition to the coercive force of the air-gap length with which it is to be used, and having a maximum demagnetizing rate for initial further knockdown of not over one-half percent per additional oersted.

8. The combination of a watt-hour meter and lightning protecting means therefor including a spark gap and a fuse connected in series between a line conductor and a ground conductor, the spark gap being sufficiently short to protect the meter from flash-overs due to lightning surges, and the fuse being adapted to melt before any arc can be maintained across the spark gap long enough to do any damage other than slight damage to the spark gap; said meter including a permanent magnet which is made of a metal having a coercive force of at least approximately 350 oersteds and which has been knocked down prior to calibration of the meter by a coercive force equivalent to at least 120 oersteds in addition to the coercive force of the air-gap length with which it is to be used, and having a maximum demagnetizing rate for initial further knockdown of not over one-half percent per additional oersted.

9. A watt-hour meter including a conventional case, a meter element within the case, connecting conductors for connecting the meter element in a circuit, and means for protecting the meter element from lightning which comprises a lightning arrestor of the spark gap type positioned within the case and connected to one of said conductors and adapted to be connected to ground, and a connecting wire forming a part of the circuit for connecting said arrestor between said conductor and ground formed of copper and chosen of a small enough diameter, at least as small as 18-gauge, to be melted by any current value which would cause an arc to be maintained across said spark gap for a sufficient length of time to do substantial damage, the meter element being connected through said conductors to the measured circuit independently of said connecting wire.

10. A watt-hour meter including a meter case and a measuring element within the case, characterized by the provision of lightning protection means within the case comprising a spark gap and a fuse normally free from current connected in series between a line conductor and a ground conductor, the spark gap being sufficiently short to protect the element from flash-overs due to lightning surges and comprising a pair of electrodes and a dielectric spacer separating the electrodes and having a slot having sufficiently small cross section in a direct line between the electrodes to have a current-limiting tendency, and which sufficiently separates the electrodes electrically to prevent the maintenance of an arc except through the slot or at extremely high voltages, and the fuse being adapted to melt before any arc can be maintained across the spark gap long enough to do any damage other than slight damage to the spark gap.

11. A watt-hour meter including a meter case and a measuring element within the case, characterized by the provision of lightning protection means within the case comprising a spark gap and a fuse normally free from current connected in series between a line conductor and a ground conductor, the spark gap being sufficiently short to protect the element from flash-overs due to lightning surges and comprising a pair of electrodes and a dielectric spacer separating the electrodes and having a slot having sufficiently small cross section in a direct line between the electrodes to have a current-limiting tendency, and which sufficiently separates the electrodes electrically to prevent the maintenance of an arc except through the slot or at extremely high voltages, and the fuse being chosen for melting characteristics equivalent to a copper wire at least as small as approximately 18-gauge to melt before any arc can be maintained across the spark gap long enough in view of the current value of the arc to do any damage other than slight damage to the spark gap.

12. The combination of a watt-hour meter and lightning protecting means therefor including a spark gap and a fuse normally free from current connected in series between a line conductor and a ground conductor, the spark gap being sufficiently short to protect the meter from flash-overs due to lightning surges, and the fuse being adapted to melt before any arc can be maintained across the spark gap long enough to do any damage other than slight damage to the spark gap; said meter including a permanent magnet which has been sufficiently knocked down so that in its position of use it is substantially unaffected by lightning surges of at least 8000 amperes in wires associated with the meter.

STANLEY S. GREEN.